US00RE37320B1

(19) United States
(12) Reissued Patent
Horton

(10) Patent Number: US RE37,320 E
(45) Date of Reissued Patent: Aug. 14, 2001

(54) HYDRAULIC LATCH PIN ASSEMBLY FOR COUPLING A TOOL TO A CONSTRUCTION EQUIPMENT

(75) Inventor: Lee A. Horton, Jefferson, MA (US)

(73) Assignee: WEC Co., Hubbardston, MA (US)

(21) Appl. No.: 09/526,973

(22) Filed: Mar. 16, 2000

Related U.S. Patent Documents

Reissue of:
(64) Patent No.: 5,727,342
Issued: Mar. 17, 1998
Appl. No.: 08/634,561
Filed: Apr. 18, 1996

(51) Int. Cl.[7] ..... E02F 3/96
(52) U.S. Cl. ..... 37/468; 414/723
(58) Field of Search ..... 37/468, 403–410; 414/723

(56) References Cited

U.S. PATENT DOCUMENTS

| | | | |
|---|---|---|---|
| 2,984,985 | * | 5/1961 | MacMillin . |
| 3,231,116 | | 1/1966 | Powell . |
| 3,269,570 | | 8/1966 | Wallberg . |
| 3,633,460 | * | 1/1972 | Ohniwa et al. . |
| 3,691,908 | * | 9/1972 | Hackmann et al. . |

(List continued on next page.)

FOREIGN PATENT DOCUMENTS

| | | | |
|---|---|---|---|
| 0052987 | * | 6/1982 | (EP) . |
| 0447119 | * | 6/1982 | (EP) . |
| 0143074 | * | 5/1985 | (EP) . |
| 0184282 | * | 6/1986 | (EP) . |
| 0273828 | * | 7/1988 | (EP) . |
| 1492504 | * | 11/1977 | (GB) . |
| 2120634 | * | 12/1983 | (GB) . |
| 2169582 | * | 7/1986 | (GB) . |
| 2172045 | * | 9/1986 | (GB) . |
| 2205299 | * | 12/1988 | (GB) . |
| 2208220 | * | 3/1989 | (GB) . |
| 55-65639 | * | 5/1980 | (JP) . |
| 1021-722 | * | 6/1983 | (SU) . |
| WO88/03198 | * | 5/1988 | (WO) . |

OTHER PUBLICATIONS

Caterpillar D8N Track–Type Tractor, Brochure, pp. 4 & 5, Jun. 1996.*
John Deere 690E LC Excavator, Brochure, p. 2, Jun. 1996.*
J.B. International Ltd., "World's No. 1 J.B. Loader–Excavator Quick Coupler," 2 pages.*
Hendrix Manufacturing Company Inc., "The Most Versatile Coupler in the World", 5 pages, Jun. 1989.*
Swift Hitch, "How Would You Change a Bucket in Seven Seconds? All it Takes is One Finger", 4 pages.*
O.E.M. Bucket Couplers (J.R.B. Pat No. 4,726,731) Brochure Copy.
Adjust–Bucket (Pat. No. 3,231,116) Brochure Copy.
Hendrix Brochure Copy.
Central Fabricators Brochure Copy.

*Primary Examiner*—Victor Batson
(74) *Attorney, Agent, or Firm*—Fish & Richardson P.C.

(57) ABSTRACT

The invention provides a coupling assembly for coupling a tool to a dipperstick, or arm, on an apparatus which has a hydraulic system for moving the tool. The coupling assembly includes a coupler body having a frame that defines a central cavity, and also having link structure for pivotally coupling to the dipperstick. An actuator assembly positioned within the central cavity includes a latch pin that can slide between an engaged position and a retracted position. In the engaged position, an end of the latch pin projects out from a rear end of the frame for engaging a receptacle defined by the tool. In the retracted position, the end of the latch pin does not project out from the frame. A bias structure normally urges the latch pin toward the engaged position with a bias force. A hydraulic latch cylinder has a fixed part and a movable part rigidly coupled to the latch pin such that, when the movable part is extended from the fixed part, the latch pin is urged to the retracted position.

52 Claims, 7 Drawing Sheets

U.S. PATENT DOCUMENTS 3,767,070 10/1973 Arnold .
3,782,249 * 1/1974 Drone .
3,854,608 12/1974 Arnold .
3,871,266 * 3/1975 Schwab et al. .
3,876,091 * 4/1975 MacDonald .
3,934,738 * 1/1976 Arnold .
3,952,431 4/1976 Gledhill et al. .
3,985,249 * 10/1976 Aker et al. .
4,030,624 6/1977 Matthews .
4,068,959 * 1/1978 Pemberton .
4,127,203 * 11/1978 Arnold .
4,136,792 * 1/1979 Wilson .
4,179,225 12/1979 Asplund .
4,187,050 * 2/1980 Barbee .
4,214,840 * 7/1980 Beales .
4,243,356 * 1/1981 Takojima .
4,251,181 * 2/1981 Drott et al. .
4,279,085 * 7/1981 Arnold .
4,311,428 * 1/1982 Arnold .
4,345,872 * 8/1982 Arnold .
4,355,945 * 10/1982 Pilch .
4,397,604 8/1983 McCain .
4,417,844 * 11/1983 De Pingon .
4,436,477 3/1984 Lenertz et al. .
4,457,085 * 7/1984 Arnold .
4,480,955 * 11/1984 Andrews et al. .
4,586,867 * 5/1986 Stafford .
4,593,791 * 6/1986 Matthews .
4,726,731 2/1988 Jones .
4,736,673 * 4/1988 Harada et al. .
4,787,237 * 11/1988 Houston et al. .
4,810,162 * 3/1989 Foster .
4,824,319 * 4/1989 Arnold .
4,833,760 * 5/1989 Sundstrom .
4,850,790 * 7/1989 Johnson et al. .
4,871,292 10/1989 Milanowski .
4,881,867 * 11/1989 Essex et al. .
4,955,779 * 9/1990 Knackstedt .
4,984,957 1/1991 Noguchi et al. .
5,010,962 * 4/1991 Bloom, Jr. ..... 414/723 X
5,049,027 * 9/1991 Morrison et al. ..... 414/723
5,082,389 * 1/1992 Balemi .
5,107,610 * 4/1992 Fusco ..... 414/723 X
5,110,254 * 5/1992 Aubrey .
5,147,173 * 9/1992 Fauber et al. ..... 414/723
5,256,026 * 10/1993 Kishi .
5,324,162 * 6/1994 Kishi .
5,332,353 * 7/1994 Arnold ..... 37/468 X
5,333,695 * 8/1994 Walter ..... 414/723 X
5,350,250 * 9/1994 Nagler ..... 37/468 X
5,400,531 * 3/1995 Brown ..... 37/468
5,467,542 11/1995 Hulden .
5,494,396 * 2/1996 Geier et al. ..... 414/723
5,546,683 * 8/1996 Clark ..... 37/468
5,597,283 1/1997 Jones .
5,618,157 4/1997 Pratt et al. .
5,802,753 9/1998 Raunisto .
5,865,594 * 2/1999 Kim ..... 37/468
5,966,850 * 10/1999 Horton ..... 37/468
5,974,706 * 11/1999 Kaczmarski et al. ..... 37/368
6,000,154 * 12/1999 Berard et al. ..... 37/468
6,074,120 * 6/2000 Williams ..... 403/326

* cited by examiner

HYDRAULIC LATCH PIN ASSEMBLY FOR COUPLING A TOOL TO A CONSTRUCTION EQUIPMENT

Matter enclosed in heavy brackets [ ] appears in the original patent but forms no part of this reissue specification; matter printed in italics indicates the additions made by reissue.

BACKGROUND OF THE INVENTION

The invention relates to tool couplers for excavation, demolition and construction equipment.

Some types of construction equipment, such as backhoes and excavators, have a movable dipperstick (also referred to as an arm) to which a variety of tools, such as, for example, buckets and grapples, can be attached. A hydraulic linkage allows the equipment operator to pivot the tool from the free end of the dipperstick. To simplify the process of changing tool attachments, a universal coupler can be fixed to the dipperstick linkage. A selected tool can then be removably attached to the coupler, a process that typically involves manually positioning at least one latch pin between the coupler and the tool.

There is a trend in the industry to use an actuated coupler on the end of the dipper stick for connecting and disconnecting a tool from the linkage. A great advantage of these systems is that the operator can actuate the coupler to connect or disconnect a tool without the assistance of another worker and without having to leave the cab of the vehicle.

One type of actuated coupler first engages a crossbar formed in the tool with hooks depending from the coupler, and then engages a latch pin (or a block or a wedge) with a mating receptacle formed in a collar on the tool. A double-action hydraulic cylinder in line with the latch pin is positioned so that the cylinder extends to push the latch pin into the receptacle. In disengaging the tool from the coupler, the operator retracts the rod into the cylinder body, pulling the pin out of the receptacle.

SUMMARY OF THE INVENTION

The invention provides a coupling assembly for coupling a tool to a dipperstick, or arm, on an apparatus which has a hydraulic system for moving the tool. The coupling assembly includes a coupler body having a frame that defines a central cavity, and also having link structure for pivotally coupling to the dipperstick. An actuator assembly positioned within the central cavity includes a latch pin movable between an extended position and a retracted position. In the extended position, an end of the latch pin projects rearward from an opening in a rear end of the frame for engaging an aperture or receptacle defined by the tool. In the retracted position, the end of the latch pin is disengaged from the tool receptacle and positioned substantially within the frame. The actuator assembly also includes a hydraulic latch cylinder that has a movable part, and a fixed part. The movable part is coupled to the latch pin by a latch pin coupling assembly, which is structured and arranged such that, when the movable part is extended from the fixed part, the latch pin moves to the retracted position.

According to another aspect of the invention, the latch pin coupling assembly includes a bias member structured and arranged to apply a bias force that urges the latch pin toward the extended position. When a threshold level of hydraulic pressure is applied to the latch cylinder, the movable part of the cylinder overcomes the bias force and extends to move the latch pin to the retracted position and out of engagement with the tool.

Another feature of the invention is that the latch cylinder can be a single-action cylinder.

According to another feature of the invention, the latch cylinder can be positioned on an axis different from an axis defined by the latch pin, such as along side the latch pin. This feature provides a compact arrangement. The system is easily adaptable to any type of quick coupler type system due to the compactness and placement of the actuating cylinder.

According to another feature of the invention, the hydraulic pressure to the latch cylinder can be controlled by an electrically actuated valve assembly that hydraulically couples the dipperstick hydraulics to the latch cylinder. The valve assembly can include one or more solenoid valves that only allow hydraulic pressure to enter and remain in the latch cylinder when they are energized.

According to another feature of the invention, the valve assembly can be structured and arranged such that the dipperstick hydraulics must be approximately fully pressurized while extended to pressurize the latch cylinder.

According to another feature of the invention, the coupling assembly can also include a pin indicator that readily shows whether the latch pin retracted. The indicator is located such that it can be viewed easily from the operator position.

According to another feature of the invention, a drop in hydraulic pressure in the latch cylinder below the threshold level allows the bias spring to push the coupling pin towards the extended position. As unexpected hydraulic pressure loss can be caused by a failure in the hydraulic system or by a failure in the valve assembly. The spring apply, hydraulic release system is safe in that it assures that an attached tool will not accidentally uncouple from the coupling assembly if there is a loss in hydraulic pressure in the latch cylinder.

The invention also provides a method of removing a tool from the coupler assembly having features as described above. An operator can remove a tool by the steps of applying hydraulic pressure to a latch cylinder that has a part fixed relative to the coupler body and a movable part rigidly coupled to the latch pin, extending the movable part from the fixed part, thereby urging the latch pin to the retracted position, engaging a cross member of the excavation tool with a hook structure depending and extending forward from the coupler body, rotating the coupler body toward the tool, aligning the latch pin with a mating receptacle formed in the excavation tool, reducing hydraulic pressure to the latch cylinder, and applying a bias force to the latch pin, urging the latch pin to the engaged position, thereby engaging the latch pin in the receptacle and securing the excavation tool to the coupler body.

According to another aspect of the invention, the method further includes the step of removing the tool from the coupler, including rotating the coupler body and the tool to a full forward position, again applying hydraulic pressure to the latch cylinder, again extending the movable part from the fixed part, thereby urging the latch pin to the retracted position and disengaging the latch pin from the receptacle, and disengaging the hook structure from the cross member of the excavation tool.

The latch cylinder extends using the more powerful head end to extract the latch pin, whereas coupling systems using an in-line dual-action cylinder and latch pin arrangement use the less powerful rod end for this purpose. This feature of the invention is important when extracting a frozen pin, which can require substantially more force than inserting a free moving pin.

Since the hydraulic system uses a single-action latch cylinder, it only requires one hydraulic line between the valve assembly and the latch cylinder. This is simple and inexpensive compared with coupling systems that use a dual-action cylinder, and that require two hydraulic connections.

The rod of the latch cylinder is normally in the retracted position during the tool working period. Because the latch cylinder is retracted, the rod of the latch cylinder is not subject to damage from rocks and sharp objects. Normally, the only time the rod is extended, and thereby exposed to the elements and contaminants, is when a tool is being attached or detached from the coupling assembly.

A feature of the invention is that if there is a loss of either electrical or hydraulic power, the latch pin will extend or "insert" automatically. If electrical power inadvertently gets to the solenoid valves, the tool has to be fully rolled forward and inward in order for the pressure to build up in the latch cylinder to retract latch pin. In this position, the coupler hooks are fully engaged and the likelihood of the tool falling off is minimized. One cannot simply throw the switch and have the tool fall to the ground.

BRIEF DESCRIPTION OF THE DRAWING

In the following detailed description of the invention, similar structures that are illustrated in different figures will be referred to with the same reference numerals.

It will also be noted that the figures are generally not drawn to scale.

DETAILED DESCRIPTION OF THE INVENTION

Figure 1:
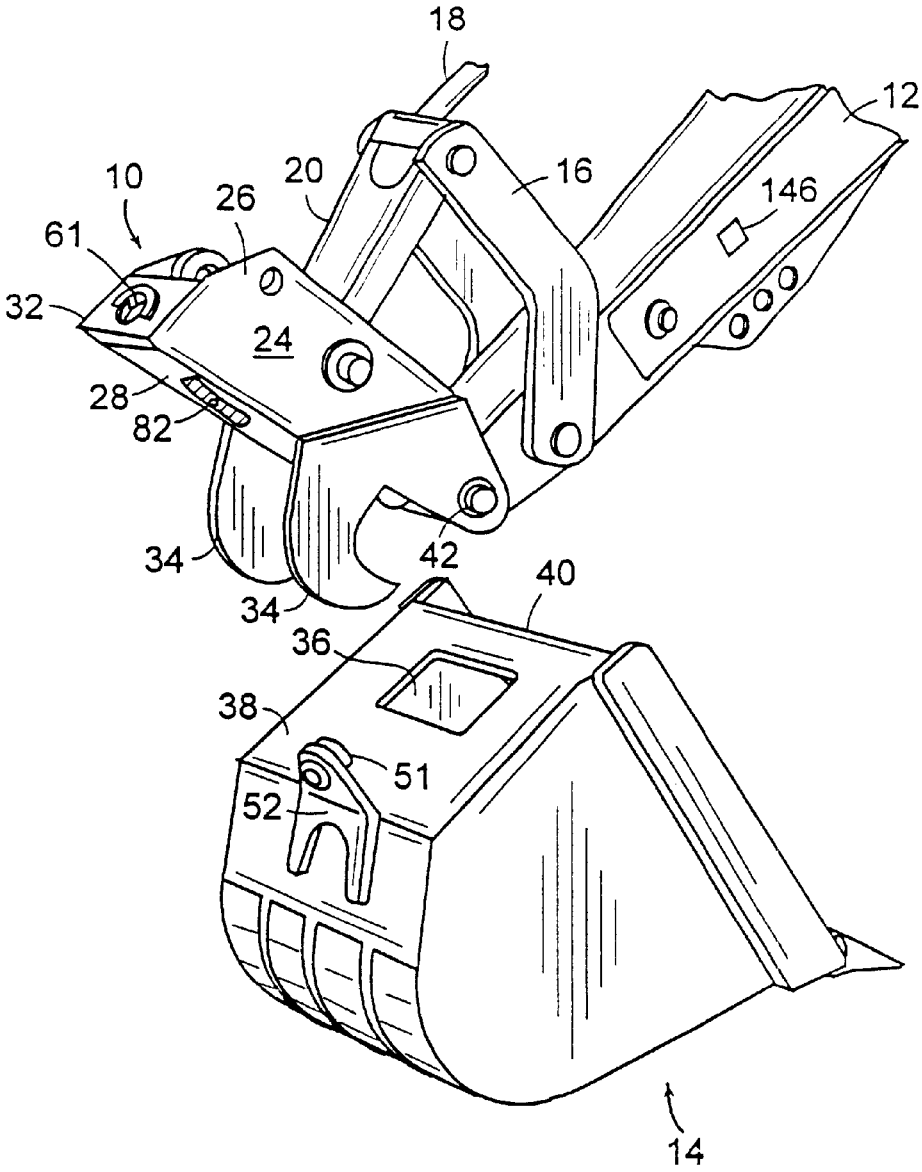
FIG. 1 is a perspective view of dipperstick with an attached coupling assembly, and a conventional bucket that can be attached to the coupling assembly.
Figure 2:
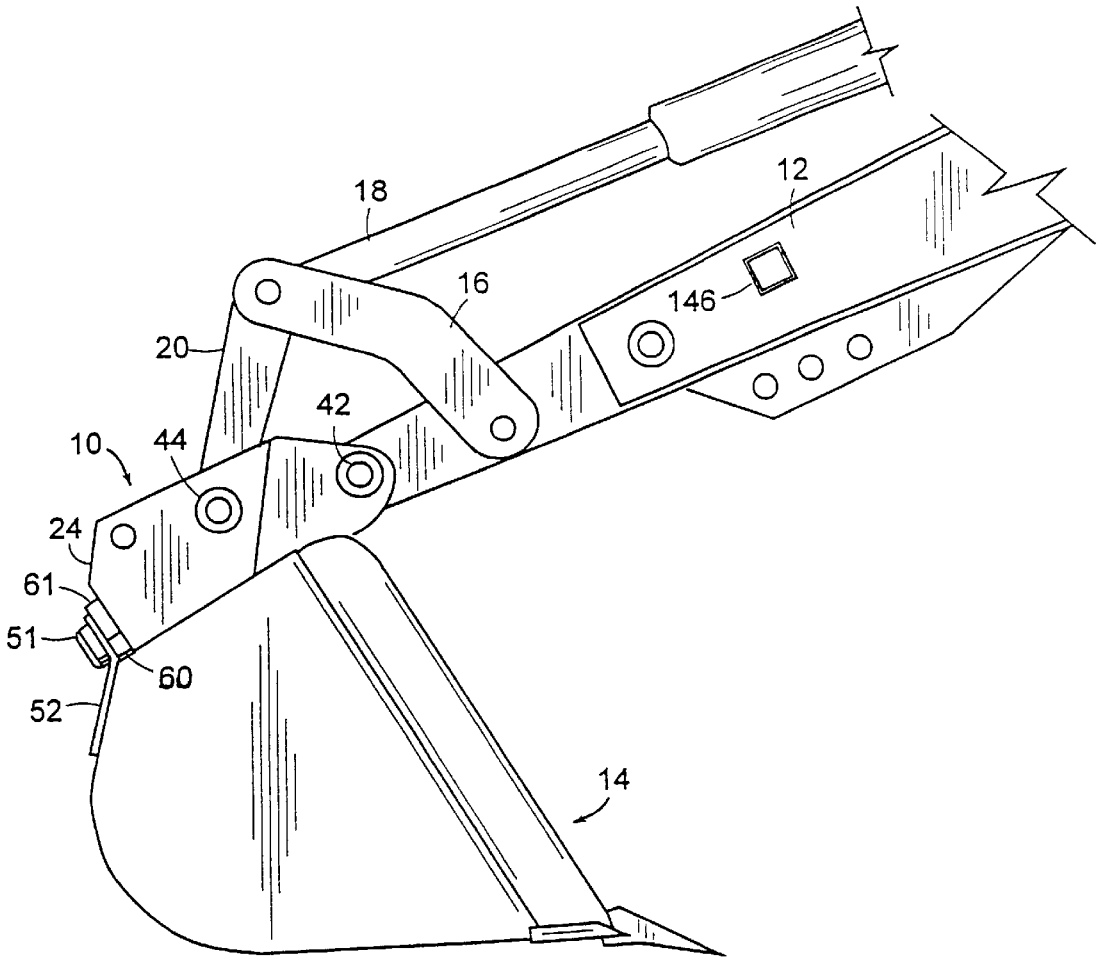
FIG. 2 is a side view of a hydraulic coupling assembly shown coupling a conventional bucket to a dipperstick.

Referring first to FIGS. 1 and 2, a hydraulic coupler assembly 10 according to the invention is attached to a conventional dipperstick or arm 12. Only a free end of dipperstick 12 is illustrated in FIGS. 1 and 2. The other end of dipperstick 12 is pivotally coupled, typically via an intermediate articulation (not shown), to a base (not shown) that includes a hydraulic power system, and hydraulic and electric operator controls located in a cab. Coupler assembly 10 can be used for coupling the dipperstick 12 to any of a variety of tools, such as, for example, a conventional bucket 14.

Dipperstick 12 linkage includes a bucket guide link 16 pivotally attached to the dipperstick 12, a bucket cylinder 18 for actuating the coupling assembly 10 and the bucket 14, and a bucket link 20. Extending bucket cylinder 18 rotates coupling assembly 10, and any tool attached to coupling assembly 10, inwardly in a forward direction.

Figure 3:
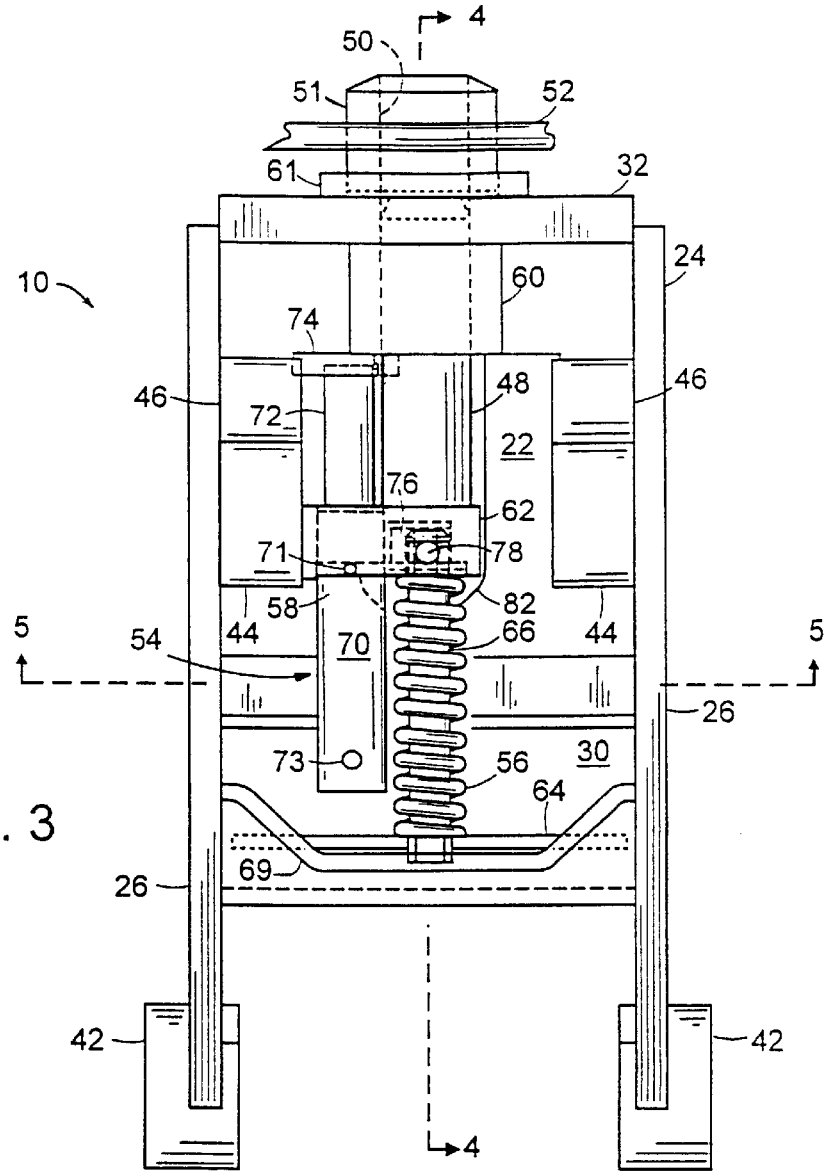
FIG. 3 is a top plan view of a coupling assembly, partially showing a bucket, with the latch pin in an unlatched, retracted position.
Figure 5:
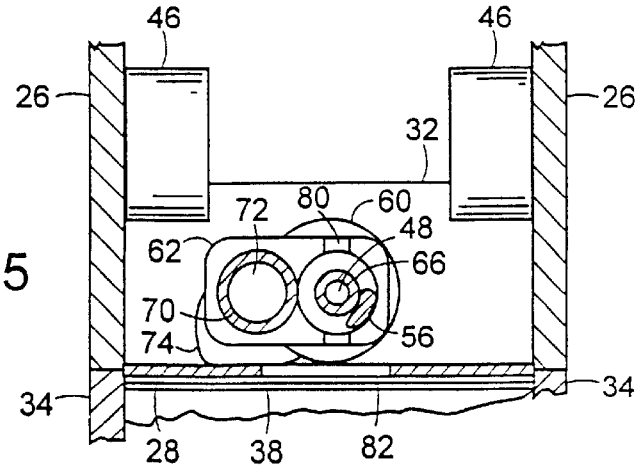
FIG. 5 is a partial section view through line 5—5 of FIG. 3.
Figure 3A:
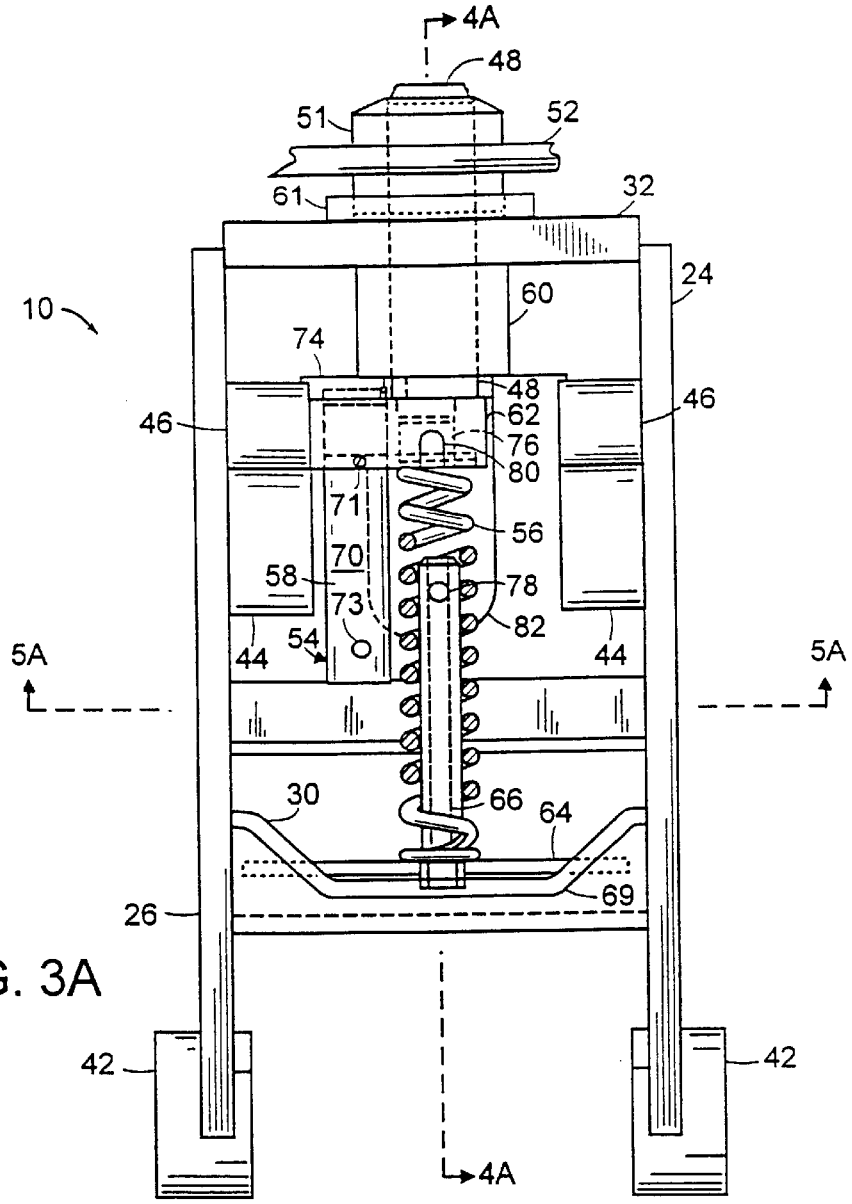
FIG. 3A is a similar view, partially broken away, showing the latch pin in a latched, extended position.
Figure 5A:
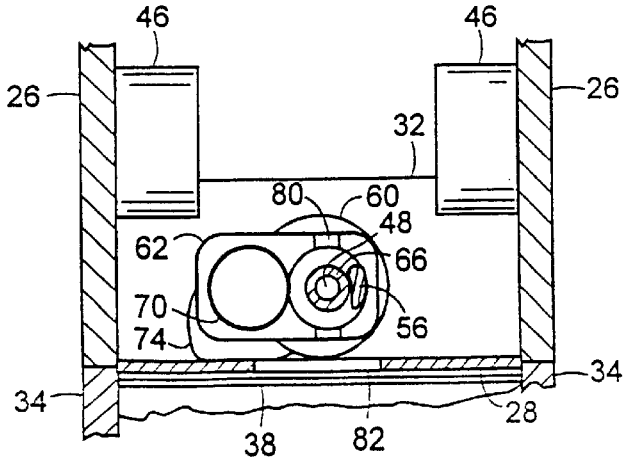
FIG. 5A is a similar partial section view through line 5A—5A of FIG. 3A.
Figure 4:
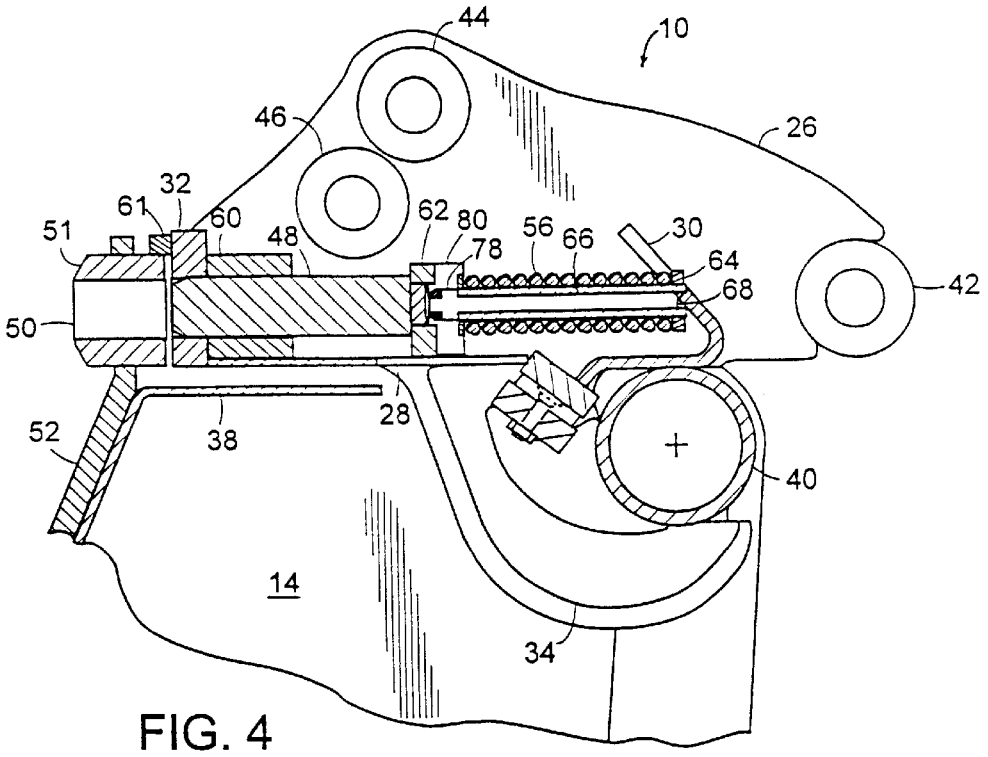
FIG. 4 is a section view through line 4—4 of FIG. 3.
Figure 4A:
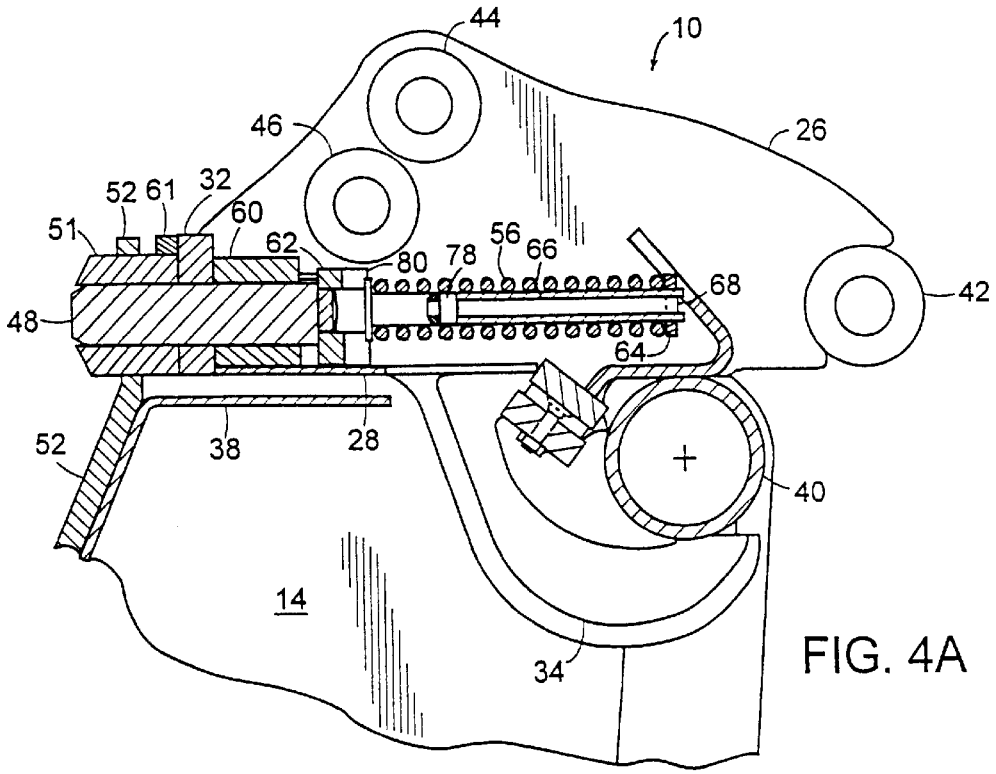
FIG. 4A is a similar section view through line 4A—4A of FIG. 3A.

Referring now also to FIGS. 3–5, coupling assembly 10 includes a frame 24 forming a central space 22. Frame 24 includes side walls 26, a bottom plate 28, a coupler spreader plate 30 and a rear face plate 32. Depending from side walls 26 are a pair of forward extending hooks 34 that are adapted to fit through an opening or recess 36 formed in a back sheet 38 of bucket 14 (see FIG. 1). The hooks 34 can then engage a cross tube 40 to support a forward end of bucket 14.

Coupling assembly 10 has a pair of dipper pivot fixtures 42, located near a forward end of side walls 26 for coupling to dipperstick 12. A pair of link pivot fixtures 44 for coupling to bucket link 20 are located closer to the rear end of the frame 26. A pair of link pivot fixtures 46 are also provided at an alternate location.

Bucket 14 is adapted to be coupled to dipperstick 12 with coupling assembly 10. As noted above, a recess 36 is formed in back sheet 38 of bucket for receiving hooks 34. Once cross tube 40 is engaged by hooks 34, the bucket can be lifted off the ground by raising the dipperstick 12. This connection provides a first point of connection between coupling assembly 10 and bucket 14. To enable the bucket 14 to rotate by operation of the bucket hydraulic cylinder 18, a receptacle 50 formed in a latch collar 51 fixed to a plate 52 on the rear end of bucket 14 engages one end of a movable latch pin 48.

Latch pin 48 slides within the bore of a bushing 60 welded to rear face plate 32 within frame 24. On the other side of plate 32 there is an approximately semicircular-shaped coupler crescent 61 that fits over the top of latch collar 51 when bucket 14 is attached to coupling assembly 10.

The latch pin 48 is part of an actuator assembly 54 that also includes a coil spring 56, or other type of compression spring, for pushing the latch pin 48 through bushing 60 into engagement with the receptacle 50, and a single-action latch pin hydraulic cylinder 58 that acts opposite the spring 56 to disengage the latch pin 48 from the receptacle 50. Spring 56 is positioned approximately in line with latch pin 48, and latch cylinder 58 is positioned on a parallel axis along side latch pin 48 and spring 56. This arrangement allows the cylinder 58 to "push" the pin 48 out to retract. The spring 56 urges the pin 48 toward an engaged position with receptacle 50 when hydraulic pressure in the latch cylinder 58 is insufficient to overcome the spring force of spring 56. The latch pin 48 is normally in the engaged position because latch cylinder 58 is normally not pressurized.

Coil spring 56 is kept in position by a latch spring assembly that forms part of actuator assembly 54. One end of coil spring 56 bears against a pin block 62 that is welded to latch pin 48. Pin block 62 includes an annular groove to receive coil spring 56. The other end of coil spring 56, towards the front of coupler 10, bears against a winged end plate 64 and thereby holds the winged end plate 64 within the "V" formed by coupler spreader plate 30. A spring guide rod 66 is positioned within the coils of spring 56. Spring guide rod 66 extends transversely through a hole formed in end plate 64 and is welded thereto. A forward end of spring guide rod 66 includes a notch 68 that is positioned against an angled top edge 69 of coupler spreader plate 30 and held in place by the spring force from spring 56. The other end of spring guide rod 66 acts as a stop for latch pin 48 in the retracted position (see FIG. 4).

The body 70 of latch cylinder 58 is fixed to pin block 62. In the embodiment illustrated in FIGS. 3–5, body 70 has screw threads formed on its outer surface and screws into mating threads formed in a through hole in pin block 62, and is held in place by a set screw 71. The cylinder's extensible rod, or piston 72, extends through the hole in pin block 62. When hydraulic pressure coupled into cylinder 58 through hydraulic fitting 73 is increased, cylinder 58 extends and the free end of piston 72 bears against push plate 72, which is welded to bushing 60.

Extension of cylinder 58 with sufficient force to overcome spring's 56 spring force thereby urges latch pin 48 to a retracted position since latch pin 48 is welded to pin block 62 and pin block 62 is fixed to cylinder body 70. Release of pressure in cylinder 58 allows spring 56 to extend, urging pin block 62, and thereby latch pin 48, toward a latched position wherein the latch pin 48 projects beyond rear face plate 32.

Pin block 62 includes a cylindrical opening 76 that receives spring guide rod 66 when latch pin 48 is retracted by actuation of cylinder 58 (see FIG. 3). As mentioned above, spring guide rod 66 stops latch pin 48 from retracting beyond a predetermined point. When latch pin 48 is fully retracted, the end of spring guide rod 66 is inside the cylindrical opening 76 in pin block 62 and projects beyond the corresponding end of spring 56. In this position, a transverse assembly hole 78 formed in the end of spring guide rod 66 is aligned with a U-shaped slot 80 formed in pin block 66. An assembly pin (not shown) can be placed in assembly hole 78. When pressure in cylinder 58 is released, latch pin 48 can be manually moved to the latched position, thereby releasing spring guide rod 66 from cylindrical opening 76 in pin block 62. Assembly pin in hole 78 keeps spring 56 compressed on spring guide rod 66. With pin block 62 out of the way, the assembled latch spring assembly, comprised of spring guide rod 66, spring 56, and winged end plate 64, can be removed as a unit from coupler 10. The latch spring assembly can be installed in coupler 10 by a reverse procedure.

Coupler 10 is structured to allow an operator in the control cab of the construction equipment to visibly assess whether the latch pin 48 is in the latched or retracted position, even when a tool is attached to coupler 10. Back sheet 38 of bucket 14 extends forward only to the attachment point of hooks 34, which leaves the forward portion of bucket 14 open between back sheet 38 and cross tube 40. Bottom plate 28 of frame 24 forms a U-shaped indicator slot 82 positioned between hooks 34. Indicator slot 82 is positioned such that pin block 62 is visible through the opening in bucket 14 and through indicator slot 82 when latch pin 48 is in the retracted position. When latch pin 48 is in the latched position, the operator's line of sight to pin block 62 is blocked by back sheet 38. Pin block 62 can be made more noticeable by painting it a bright color.

Figure 6:
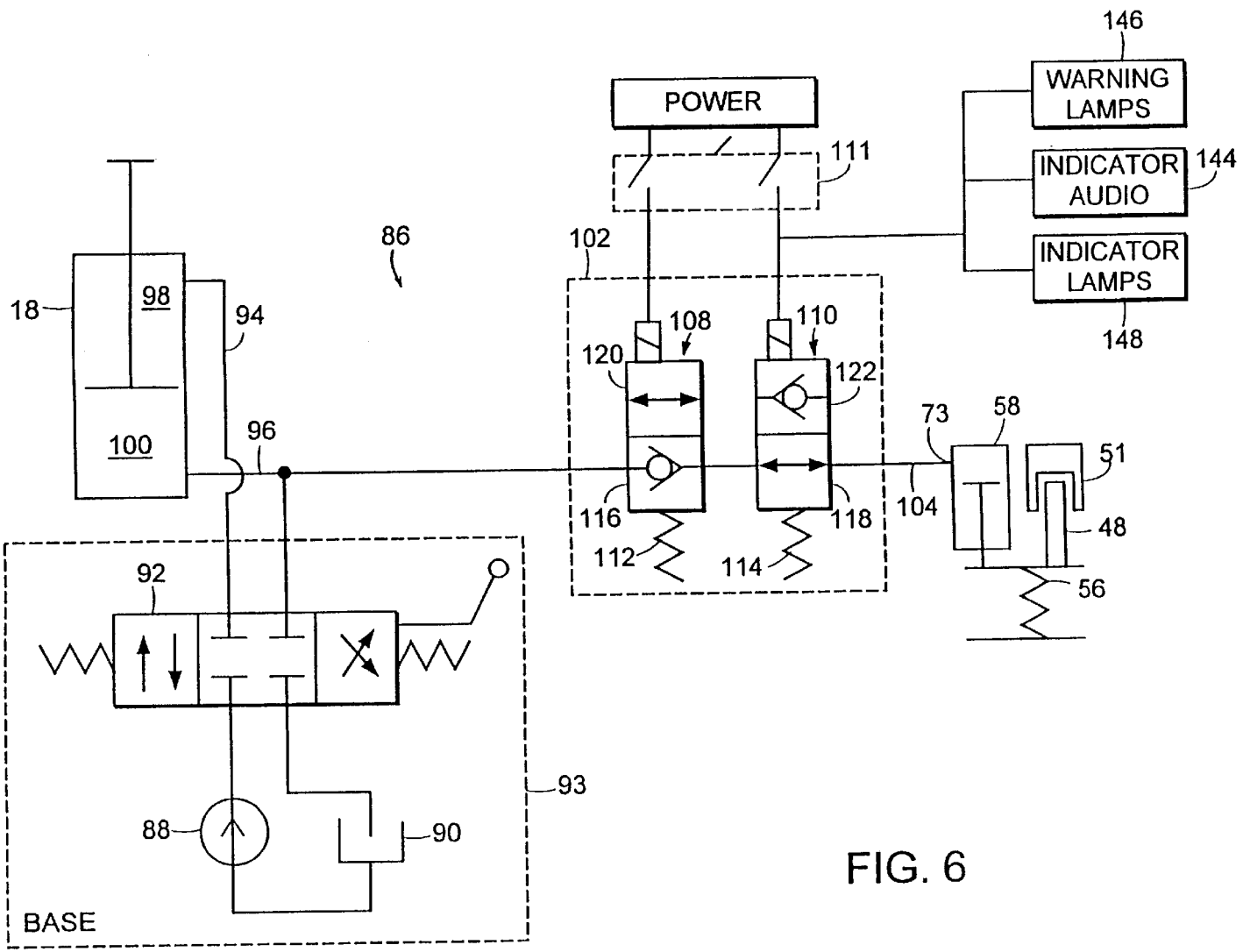
FIG. 6 is a schematic diagram of a hydraulic system and an electrical system according to the invention.

Referring now also to FIG. 6, a hydraulic circuit 86 for operating latch cylinder 58 taps into the hydraulics of the excavator. A hydraulic pump 88 and a reservoir 90 are coupled to bucket cylinder 18 via a lever-operated, three-position, two-pole valve 92. Pump 88, reservoir 90 and valve 92 are located in the base 93 of the excavator. Hydraulic hoses 94, 96 connect between valve 92 and the rod end 98 and cylinder end 100 of bucket cylinder, respectively. Hydraulic hose 96 has a T-connection leading to one port of a valve assembly 102. The T-connection can be conveniently made at the hydraulic fitting for the cylinder side 100 of bucket cylinder 18. The other port of valve assembly 102 connects via hydraulic hose 104 to fitting 73 in latch cylinder 58. Valve assembly 102 can be strapped, bolted or otherwise attached to a fixed part of bucket cylinder 18 or to an upper portion of dipperstick 12.

Valve assembly 102 includes two solenoid actuated valves 108, 110, each with a power connection controlled by a locking electrical toggle switch 111 located in the cab of the excavator. In an unlatch switch position the solenoids are energized and in a latch switch position the solenoids are shut off. When the solenoids are not energized (see FIG. 6), springs 112, 114 urge valves 108, 110, respectively to a position wherein a check valve portion 116 of valve 108 and a through portion 118 of valve 110 are connected in series between lines 96 and 104. When valves 108, 110 are energized (not shown), a through portion 120 of valve 108 and a check valve 122 portion of valve 110 are placed in the circuit.

Check valve 116 blocks a hydraulic flow from bucket cylinder 18 to latch cylinder 58, but is set to permit flow in the other direction when there is an over-pressure condition in the latch cylinder 58 relative to the cylinder side 100 of bucket cylinder 18. Check valve 122, on the other hand, blocks any back flow from latch cylinder 58 to bucket cylinder 18, and is set to permit the latch cylinder 58 to be pressurized when the cylinder side 100 of bucket cylinder 18 is fully pressurized. With the cylinder side 100 fully pressurized, bucket cylinder 18 will be fully extended and the coupling assembly 10 will be rotated fully forward.

Figure 6A:
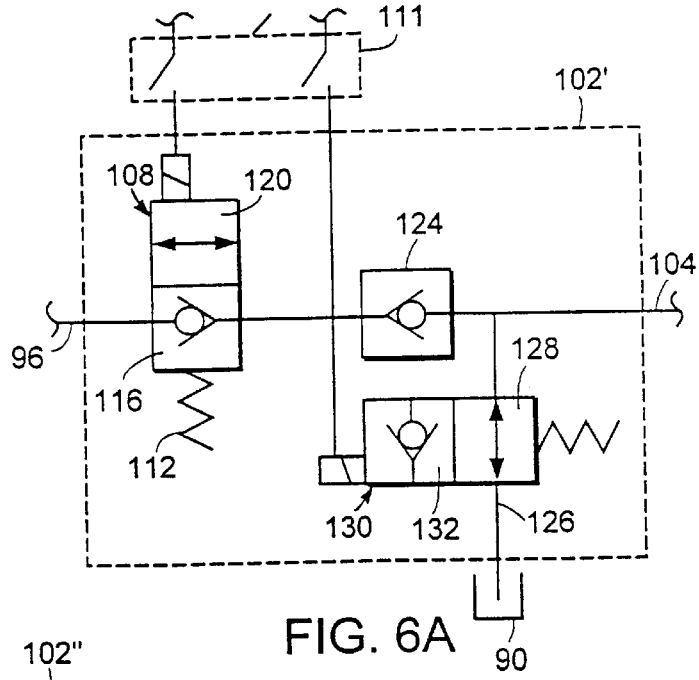
FIGS. 6A, 6B and 6C illustrate other embodiments of a valve assembly.

Referring now to FIG. 6A, another embodiment of a valve assembly 102 includes valve 108 in series with check valve 124 between lines 96 and 104. Check valve 24 prevents back flow from line 104 to 96. A drain line 126 normally connects between line 104 and reservoir 90 via through portion 128 of solenoid valve 130. When valves 108 and 130 are energized, drain line 126 is blocked by check valve portion 132 of valve 130, and through portion 120 is positioned in series connection with check valve 124 between lines 96 and 104. Check valve 124, similar to check valve portion 122, is set to permit pressurization of line 104 and latch cylinder 58 when full hydraulic pressure is applied to extend bucket cylinder 18.

Figure 6B:
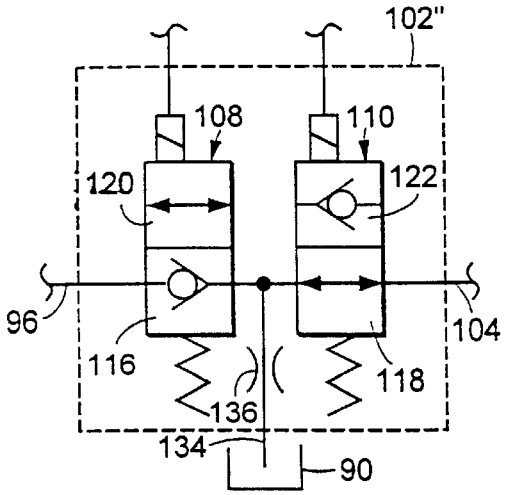

Referring to FIG. 6B, in a third embodiment, valve assembly 102" is configured with solenoid valves 108 and 110, similar to the arrangement of valve assembly 102. In addition, a drain line 134 connects between valves 108 and 110. Flow through drain line 134 to reservoir 90 is limited by an orifice 136 flow limiter.

Figure 6C:
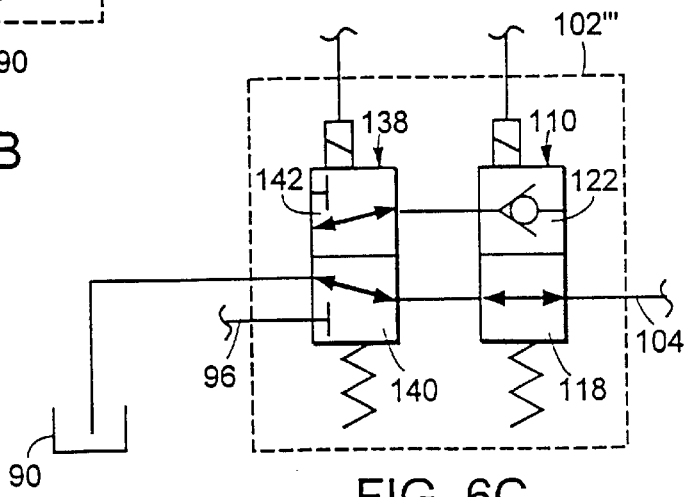

Referring now to FIG. 6C, a fourth embodiment of a valve assembly 102'" includes solenoid valves 136 and 110. In the normal, non-energized configuration shown in the drawing, cylinder 58 drains to reservoir 90 via through portion 118 of valve 110 and lower through portion 140 of valve 138. When valves 110, 138 are energized, pressure line 96 is coupled to cylinder 58 via upper through portion 142 of valve 138 and check valve portion 122 of valve 110.

Valve assemblies 102', 102" and 102'" can be safer than valve assembly 102, especially in high back pressure systems, because of the drain connections to reservoir 90, however, the drain connections require an additional hydraulic hose.

Referring again to FIG. 6, indicator lights 148 and an audible indicator 144, such as a beeper sound device, located in the cab alert the operator that the switch 111 is in the energized, unlatch position. A warning lamp 146 mounted on the dipperstick 12 lights or flashes to help to alert surrounding personnel that the switch 111 is in the unlatch mode and that the latch pin 48 could be retracted. Of course, audible indicator 144 can be configured to be audible outside the operator cab.

A single operator in the cab of the excavation equipment can detach a tool, such as bucket 14, to the coupling assembly 10 and attach a new tool to the coupling assembly without any assistance, as described in detail below. Some particulars of the following recitation of steps for coupling and removing a tool are made with reference to the embodiment of valve assembly 102 illustrated in FIG. 6. It will be understood that the embodiments of valve assemblies 102', 102", and 102''' illustrated in FIGS. 6A, 6B, and 6C, respectively, will function in much the same manner, and the operator will make essentially the same sequence of steps to attach or detach a tool.

To decouple a tool from coupling assembly 10, the latch pin 48 must be moved to the retracted position. The operator first throws switch 111 in the cab to the unlatch position. The indicator lamps 148 and warning lamps 146 then light up, and the audible indicator 144 sounds. The solenoids becomes energized, which moves solenoid valves 108, 110 in valve assembly 102 to their unlatch position. Check valve 116 is moved out of hydraulic circuit 89 and check valve 122 is moved into hydraulic circuit 89. This, by itself, is insufficient to retract latch pin 48. Check valve 122 is set to prevent passage of hydraulic fluid and thus prevent latch cylinder 58 from being pressurized until the pressure on the cylinder side 100 of bucket cylinder 18 is greater than a predetermined value.

In the illustrated embodiments, check valve 122 is set such that the coupling assembly 10 and attached tool 14 must be rotated fully forward and approximately full pressure must be applied in line 96 to bucket cylinder 18 to open check valve 122. This assures that accidentally throwing switch 111 will not, by itself, be sufficient to retract latch pin 48.

Once the pressure in latch cylinder 58 is great enough to overcome the spring force of spring 56, latch cylinder 58 extends and thereby retracts latch pin 48. The operator can confirm that the latch pin 48 is retracted if he sees the pin block 62 in the retracted position. While the switch 111 is still in the "unlatch" position, the latch pin 48 will be held back retracted.

Alternatively, to bring the latch pin 48 to the retracted position, the operator can first rotate coupling assembly 10 forward, fully pressurize bucket cylinder 18, and then throw switch 111 to the unlatch position.

At this point, solenoid valves 108, 110 are still energized and in the unlatch position, and check valve 122 retains pressure in latch cylinder 58. The operator can then use free hands to maneuver the vehicle to disengage the hooks 34 from cross member 40 to uncouple the tool.

If the equipment is to remain idle for a period of time, the operator throws toggle switch 111 to the latch position, de-energizing the solenoid valves in valve assembly 102, and lowers hydraulic pressure in line 96. This allows pressure to drop in latch cylinder 58 such that spring 56 urges latch pin 48 to the engaged, or latched position, thereby bringing the piston 72 of cylinder 58 to a protected position retracted into cylinder body 70.

To attach a new tool, with the latch pin 48 still in the retracted position and the valves in the valve assembly 102 still energized, the operator adjusts pressure in the bucket cylinder 18 and maneuvers the coupling assembly 10 to insert hooks 34 into the recess 36 of the new tool and engage cross tube 40. The operator then lifts the tool off the ground, and rolls coupling assembly 10 forward by extending bucket cylinder 18. Coupler crescent 61 engages an upper side of latch collar 51, thus bringing latch pin 48 into alignment with receptacle 50 on bucket 14. The operator knows that the coupler crescent 61 has engaged latch collar 51 when he sees the bucket 14 visibly begins to roll forward. Less than full pressurization of the bucket cylinder 18 is typically required to bring the coupling assembly to this position.

The operator then throws switch 111 to the latch position. This de-energizes solenoid valves 108, 110 and moves check valve 122 out of hydraulic circuit 86 and check valve 116 into hydraulic circuit 86. Check valve 116 is set to open at a low differential pressure, such that hydraulic pressure will be released from the latch cylinder 58 when the back pressure in bucket cylinder 18 is much less than full pressure but great enough to rotate coupling assembly forward so that the coupling crescent engages the tool latch collar 50.

When the hydraulic pressure in latch cylinder 58 is released, spring 56 moves latch pin 48 into the engaged position with receptacle 50. The position of pin block 62 gives the operator a visible signal that the pin 48 is latched and the tool secured. Check valve 116 thereafter prevents the latch pin assembly from being inadvertently pressurized.

Other embodiments of the invention are within the scope of the following claims.

What is claimed is:

1. A coupling assembly for coupling a tool to an arm of an apparatus, wherein tilting of the coupling assembly from the arm is powered by a hydraulic system, the coupling assembly comprising:

a coupler body, including a frame defining a central cavity, and link structure for pivotally coupling the arm to the tool; and an actuator assembly attached to the frame, the actuator assembly including:

a latch pin movable between an extended position for engaging a receptacle defined by the tool, and a retracted position for disengaging from the receptacle;

a hydraulic latch cylinder having a fixed part and a movable part that can be extended relative to the fixed part; and a latch pin coupling assembly coupling between the latch pin and the movable part such that extension of the movable part urges the latch pin to the retracted position.

2. The coupling assembly of claim 1, wherein the latch pin coupling assembly comprises a bias structure that urges the latch pin towards the extended position with a bias force.

3. The coupling assembly of claim 2, wherein the bias structure includes a compression spring positioned between a second end of the latch pin and an end plate fixed within the frame.

4. The coupling assembly of claim 1, further comprising a hydraulic switch assembly operably coupling hydraulic pressure from the hydraulic system to the latch cylinder.

5. The coupling assembly of claim 4, wherein the hydraulic switch assembly includes a solenoid valve assembly structured and arranged to couple hydraulic pressure to the latch cylinder when energized and to release hydraulic pressure from the latch cylinder when de-energized.

6. The coupling assembly of claim 5, wherein the hydraulic switch assembly further includes a system that produces a warning signal indicative of the valve assembly being energized.

7. The coupling assembly of claim 1, wherein the actuator assembly includes an indicator member coupled to the latch pin and visible from outside the frame by an operator of the apparatus such that the position of the indicator member indicates the position of the latch pin to the operator.

8. The coupling assembly of claim 1, wherein the coupler body further comprises a hook depending from the frame and projecting towards a forward end thereof and structured for engaging mating structure formed in the tool.

9. The coupling assembly of claim 1, wherein the latch cylinder is positioned on an axis different from an axis defined by the latch pin.

10. The coupling assembly of claim 1, wherein the latch cylinder is a single-action cylinder.

11. A latch pin actuator assembly for urging a latch pin of a tool coupler into and out of engagement with a mating receptacle formed in a tool, the actuator assembly comprising:

a hydraulic latch cylinder having a fixed part and a movable part that extends from the fixed part when hydraulic pressure from a hydraulic system is applied to the latch cylinder; and a latch pin coupling assembly adapted to couple between the latch pin and the movable part of the latch cylinder structured and arranged to retract the latch pin to a retracted position for disengaging the latch pin from the receptacle when the movable part is extended.

12. The actuator assembly of claim 11, wherein the latch pin coupling assembly comprises a bias member structured and arranged to urge the latch pin towards the extended position with a bias force.

13. The actuator assembly of claim 12, wherein the bias member includes a compression spring adapted to be positioned between a second end of the latch pin and an end plate within the frame.

14. The actuator assembly of claim 11, further comprising a hydraulic switch assembly operably coupling hydraulic pressure from the hydraulic system to the latch cylinder.

15. The actuator assembly of claim 14, wherein the hydraulic switch assembly includes a solenoid valve assembly structured and arranged to couple hydraulic pressure to the latch cylinder when energized and to release hydraulic pressure from the latch cylinder when de-energized.

16. The actuator assembly of claim 15, wherein the hydraulic switch assembly further includes a system that produces a signal indicative of the valve assembly being energized.

17. The actuator assembly of claim 11, further including an indicator member coupled to the latch pin and visible from outside the tool coupler such that the position of the indicator member is indicative of the position of the latch pin.

18. The actuator assembly of claim 11, wherein the latch cylinder is positioned on an axis different from an axis defined by the latch pin.

19. The actuator assembly of claim 11, wherein the latch cylinder is a single-action cylinder.

20. The actuator assembly of claim 12, wherein the bias member and the latch cylinder are selected such that approximately full hydraulic pressure from the hydraulic system is required for latch cylinder overcome the bias force and retract the latch pin.

21. A tool coupler for coupling an excavation to an apparatus for operating the excavation tool, the apparatus including a base, a hydraulic system in the base with controls for distributing hydraulic pressure from the hydraulic system, a movable dipper stick having a free end, and a hydraulic tool cylinder hydraulically coupled to the hydraulic system, the tool coupler comprising:

a frame, including side walls and cross members that define a central space, a dipper pivot at a forward end of the frame for pivotally connecting to the free end of the dipper stick, and a link pivot located rearward from the dipper pivot for pivotally coupling to an end of the tool cylinder, wherein extension of the tool cylinder rotates the frame forward around the dipper pivot;

forward extending hook structure depending from the frame, structured and arranged to engage a cross member located at an upper and forward portion of the tool;

an actuator assembly attached to the frame, the actuator assembly including: a latch pin located substantially within the central space and movable between an extended position wherein a first end of the latch pin projects out from a rear end of the frame for engaging a receptacle formed in the excavation tool, and a retracted position for disengaging from the receptacle of the excavation tool; a bias member structured and arranged to apply a bias force to the latch pin urging the latch pin towards the extended position; a hydraulic latch cylinder having a fixed part and a movable part that can be extended from the fixed part; and a latch pin coupling assembly coupling between the latch pin and the movable part such that extension of the movable part urges the latch pin to the retracted position; and a hydraulic switch assembly operably coupling hydraulic pressure from the hydraulic system to the latch cylinder.

22. The coupling assembly of claim 21, wherein the hydraulic switch assembly includes a solenoid valve assembly that couples hydraulic pressure from the tool cylinder to the latch cylinder when energized and that permits release of hydraulic pressure from the latch cylinder when de-energized.

23. The coupling assembly of claim 21, wherein the latch cylinder is positioned on an axis different from an axis defined by the latch pin.

24. The coupling assembly of claim 21, wherein the latch cylinder is a single-action cylinder.

25. A method for coupling an excavation tool to a coupler body pivotally attached at an end of an arm, the coupler body including a latch pin capable of sliding between an engaged position with an end of the latch pin projecting out from the coupler body and a retracted position with the end not projecting out from the coupler body, the method comprising:

applying hydraulic pressure to a latch cylinder that has a part fixed relative to the coupler body and a movable part coupled to the latch pin;

extending the movable part relative to the fixed part, thereby urging the latch pin to the retracted position;

engaging a cross member of the excavation tool with a hook structure depending and extending forward from the coupler body;

rotating the coupler body toward the tool, aligning the latch pin with a mating receptacle formed in the excavation tool;

reducing the hydraulic pressure to the latch cylinder; and applying a bias force to the latch pin, urging the latch pin to the engaged position, thereby engaging the latch pin in the receptacle and securing the excavation tool to the coupler body.

26. The method of claim 25, wherein applying hydraulic pressure includes applying sufficient hydraulic pressure for the cylinder to overcome the bias force.

27. The method of claim 26, wherein applying hydraulic pressure includes energizing a solenoid actuated valve to couple hydraulic pressure from a hydraulic cylinder for rotating the coupler body to the latch cylinder.

28. The method of claim 27, further comprising providing a signal indicative that the solenoid valve is energized.

29. The method of claim 25, further comprising providing a visible indication of when the latch pin is retracted.

30. The method of claim 25, further comprising removing the tool, including:

rotating the coupler body and the tool to a full forward position;

again applying hydraulic pressure to the latch cylinder;

again extending the movable part from the fixed part, thereby urging the latch pin to the retracted position and disengaging the latch pin from the receptacle; and disengaging the hook structure from the cross member of the excavation tool.

31. A coupling assembly for coupling a bucket to a dipperstick of an hydraulic equipment, the coupling assembly comprising:

a frame structured for attachment to the dipperstick and including an aperture formed by an underside;

an actuator assembly in the frame, including a latch pin, the actuator assembly structured to move a latch pin between an engaged position engaged with a mating structure of the bucket and a retracted position disengaged from the mating structure; and an indicator member coupled to the latch pin and movable therewith, wherein the indicator member is visible through an opening of the bucket and through the aperture from outside the frame by an operator of the equipment such that the position of the indicator member indicates the position of the latch pin to the operator.

32. A method of operating a bucket from a free end of a dipperstick of an excavation equipment, comprising:

providing a coupler at the free end of the dipperstick, the coupler including a body and latch pin capable of sliding between an engaged position with an end of the latch pin projecting out from the coupler body and a retracted position with the end of the latch pin retracted within the coupler body;

attaching a bucket to the coupler by moving the coupler pin to the engaged position engaged with a mating structure of the bucket; and viewing an indicator member, coupled with the latch pin, through an opening of the bucket when the latch pin is moved to a retracted position disengaged from the mating structure.

*33. A coupling assembly for coupling a tool to an arm of an apparatus, wherein tilting of the coupling assembly from the arm is powered by a hydraulic system, the coupling assembly comprising:*

*a coupler body, including a frame defining a central cavity, and link structure for pivotally coupling the arm to the tool; and*

*an actuator assembly attached to the frame, the actuator assembly comprising:*

*a latch pin movable between an extended position for securing the tool to the arm, and a retracted position for releasing the tool;*

*a hydraulic latch cylinder having a fixed part and a movable part that can be extended relative to the fixed part; and*

*a latch pin coupling assembly coupling between the latch pin and the movable part such that extension of the movable part urges the latch pin to the retracted position.*

*34. The coupling assembly of claim 33, wherein the latch pin coupling assembly comprises a bias structure that urges the latch pin towards the extended position with a bias force.*

*35. The coupling assembly of claim 34, wherein the bias structure comprises a compression spring positioned between an end of the latch pin and an end plate fixed within the frame.*

*36. The coupling assembly of claim 33, further comprising a hydraulic switch assembly operably coupling hydraulic pressure from the hydraulic system to the latch cylinder.*

*37. The coupling assembly of claim 36, wherein the hydraulic switch assembly comprises a solenoid valve assembly structured and arranged to couple hydraulic pressure to the latch cylinder when energized and to release hydraulic pressure from the latch cylinder when de-energized.*

*38. The coupling assembly of claim 37, wherein the hydraulic switch assembly further comprises a system that produces a warning signal indicative of the valve assembly being energized.*

*39. The coupling assembly of claim 33, wherein the actuator assembly comprises an indicator member coupled to the latch pin and visible from outside the frame by an operator of the apparatus such that the position of the indicator member indicates the position of the latch pin to the operator.*

*40. The coupling assembly of claim 33, wherein the coupler body further comprises a hook depending from the frame and projecting towards a first end thereof and structured for engaging mating structure formed in the tool.*

*41. The coupling assembly of claim 33, wherein the latch cylinder is positioned on an axis different from an axis defined by the latch pin.*

*42. The coupling assembly of claim 33, wherein the latch cylinder is a single-action cylinder.*

*43. A tool coupler for coupling an excavation tool to an apparatus for operating the excavation tool, the apparatus including a base, a hydraulic system in the base with controls for distributing hydraulic pressure from the hydraulic system, a movable dipper stick coupled to the base and having a free end, and a hydraulic tool cylinder hydraulically coupled to the hydraulic system and having one end pivotally linked to the dipper stick at a location spaced apart from the free end of the dipper stick, the tool coupler comprising:*

*a frame, comprising side walls and cross members that define a central space, a dipper pivot at a forward end of the frame for pivotally connecting to the free end of the dipper stick, and a link pivot located rearward from the dipper pivot for pivotally coupling to a second end of the tool cylinder, wherein extension of the tool cylinder rotates the frame forward around the dipper pivot;*

*a hook structure depending from the frame, structured and arranged to engage a cross member located at a first end of the tool;*

*an actuator assembly attached to the frame, the actuator assembly comprising: a latch pin located substantially within the central space and movable between an extended position wherein a first end of the latch pin secures a mating structure of the excavation tool to the tool coupler, and a retracted position for releasing the mating structure of the excavation tool from the tool coupler; a bias member structured and arranged to apply a bias force to the latch pin urging the latch pin towards the extended position; a hydraulic latch cylinder having a fixed part and a movable part that can be extended from the fixed part; and a latch pin coupling assembly coupling between the latch pin and the movable part such that extension of the movable part urges the latch pin to the retracted position; and*

*a hydraulic switch assembly operably coupling hydraulic pressure from the hydraulic system to the latch cylinder.*

*44. The coupling assembly of claim 43, wherein the hydraulic switch assembly includes a solenoid valve assembly that couples hydraulic pressure from the tool cylinder to the latch cylinder when energized and that permits release of hydraulic pressure from the latch cylinder when de-energized.*

*45. The coupling assembly of claim 43, wherein the latch cylinder is positioned on an axis different from an axis defined by the latch pin.*

*46. The coupling assembly of claim 43, wherein the latch cylinder is a single-action cylinder.*

*47. A method for coupling an excavation tool to a coupler body pivotally attached at the end of an arm, the coupler body comprising a latch pin capable of sliding between an extended position and a retracted position, the method comprising:*

*applying hydraulic pressure to a latch cylinder that has a part fixed relative to the coupler body and a movable part rigidly coupled to the latch pin;*

*extending the movable part relative to the fixed part, thereby urging the latch pin to the retracted position;*

*engaging a cross member of the excavation tool with a hook structure depending and extending from the coupler body;*

*rotating the coupler body toward the tool to position a mating structure of the tool to be secured by the latch pin;*

*reducing hydraulic pressure to the latch cylinder; and*

*applying a bias force to the latch pin, urging the latch pin to the extended position to secure the mating structure, and thereby the excavation tool, to the coupler body.*

*48. The method of claim 47, wherein applying hydraulic pressure includes applying sufficient hydraulic pressure for the cylinder to overcome the bias force.*

*49. The method of claim 48, wherein applying hydraulic pressure includes energizing a solenoid actuated valve to couple hydraulic pressure from a hydraulic cylinder for rotating the coupler body to the latch cylinder.*

*50. The method of claim 49, further comprising providing a signal indicative that the solenoid valve is energized.*

*51. The method of claim 47, further comprising providing a visible indication of when the latch pin is retracted.*

*52. The method of claim 47, further comprising removing the tool, including:*

*rotating the coupler body and the tool to a full forward position;*

*again applying hydraulic pressure to the latch cylinder;*

*again extending the movable part from the fixed part, thereby urging the latch pin to the retracted position and releasing the mating structure of the excavation tool; and*

*disengaging the hook structure from the cross member of the excavation tool.*

* * * * *